Patented Oct. 17, 1950

2,525,972

UNITED STATES PATENT OFFICE 2,525,972

FABRICATION OF ARTICLES FROM POLYAMIDES BY HOT WORKING

Louis L. Stott, Reading, Pa., assignor to The Polymer Corporation, Reading, Pa., a corporation of Pennsylvania No Drawing. Application December 14, 1948, Serial No. 65,298

10 Claims. (Cl. 18—55)

This invention relates to the fabrication of articles from the synthetic polyamide materials known as nylon.

One of the principal forms of nylon commonly available on the market comprises a high melting synthetic linear condensation polyamide formed from the reaction product of hexamethylene diamine and adipic acid. It has been known for some time that this material may be molded in various ways, by heating the material above its melting point. For instance, in my copending applications, Serial Nos. 624,241, filed October 24, 1945, and 766,021, filed August 4, 1947, which latter issued as Patent No. 2,505,807 on May 2, 1950, certain methods for molding nylon under pressure are disclosed. Injection molding of nylon has also been known, the same being disclosed in Patent 2,372,630, issued March 27, 1945, such injection molding requiring heating the nylon above its melting point.

I have found that pieces of nylon of substantial cross-section may be fabricated or shaped by the employment of hot working below its melting point, within a fairly critical temperature range; and that such hot working has a number of advantages from the standpoint of fabrication of articles. While it has been known that nylon filaments can be cold drawn, the known techniques for this purpose are not applicable to pieces of substantial cross-section, for instance to rods of diameter ranging upwards of ¼ inch.

In considering the nature of the present invention in greater detail, and also the advantages thereof, attention is called to certain characteristics of nylon which have heretofore given rise to difficulties in fabrication.

To illustrate, reference is made to the commonly available nylon known as polyhexamethylene adipamide. This material has a relatively sharp melting point at about 505° F. At temperatures even only slightly above the melting point, the material is quite fluid, i. e., is of relatively low viscosity, which makes it difficult to handle by many conventional fabrication techniques, such as the common type of compression molding and screw type extrusion above the melting point. At temperatures above its melting point, the material is rather readily subject to oxidation, so that those fabrication techniques which bring the material into contact with the air above its melting point, are subject to the disadvantage of incurring oxidation.

In addition, nylon is subject to relatively great shrinkage upon solidification, which also introduces difficulties in attempting to apply conventional molding techniques, or any other fabrication technique requiring initial heating of the material above its melting point.

I have found that the specific form of nylon above mentioned may effectively be hot worked at a temperature between about 425° F. and 500° F., most advantageously between the narrow range from about 440° F. to about 480° F. In this temperature range the material may be worked by forging, swaging, rolling, or hydraulic extrusion. The possible extent of reduction or working depends on the type of hot working employed but may be as great as 3 or 4 to 1, on the basis of cross-sectional area.

A particularly effective method for hot working according to this invention is by the employment of an extrusion die. To illustrate, a substantially cylindrical slug formed of nylon of the specific type mentioned above, and of 1⅛" diameter, was extruded under hydraulic pressure at a starting temperature of about 460° F., to form a rod ⅝" in diameter by the employment of an extrusion die having a cone angle of 165°. This represents a cross-sectional reduction in area of 3.2 to 1.

Such hot working requires relatively high pressure, the initial pressure applied in the extrusion example given just above being of the order of 10 to 12 tons per square inch. After the start of extrusion required pressures were found to be only 6 to 8 tons per square inch.

As another example; reference is made to the extrusion of a cylindrical slug of the same type of nylon, of ¾" diameter, to produce a rod of ½" diameter, this being effected at a starting temperature of about 445° F. and through an extrusion die also having a cone angle of 165°. In this example, the tensile strength of the ¾" slug was approximately 11,000 pounds per square inch, whereas, after extrusion, the rod produced had a tensile strength of about 18,000 pounds per square inch.

With respect to both of the examples referred to just above, attention is called to the fact that the slug employed was pre-formed by molding under pressure, in accordance with the disclosure of my copending application, Serial No. 766,021, above referred to. Although the molding technique of my copending applications above identified need not be considered in detail herein, certain important characteristics of the techniques disclosed in said two prior applications are of importance in the fabrication of articles according to the present invention, and these important characteristics are therefore briefly referred to herebelow.

The methods disclosed in my prior applications above identified are particularly effective in producing slugs to be employed for hot working in accordance with the present invention, for reasons brought out more fully herebelow.

In accordance with the methods disclosed in my prior applications, the nylon, usually in granular or flake form, is packed or charged into appropriately shaped mold members, and the mold member, with the charge therein, is thereupon closed to avoid ingress of any appreciable quantity of air. The charge of nylon in the mold member is heated to a temperature above its melting point while remaining in the mold member, and thereafter pressure is applied, preferably endwise of an elongated piece or slug, the pressure being maintained at a relatively high value during at least a substantial portion of the temperature drop, i. e., until a temperature considerably below the melting point is reached. The pressure applied to the pieces being molded is preferably of the order of 20,000 pounds per square inch, say from 10,000 pounds per square inch up to 40,000 or 50,000 pounds per square inch. In this way an elongated rod or slug is molded without incurring any appreciable oxidation and under conditions yielding a slug of sound structure throughout.

The prior techniques described above are especially suitable to the production of rod stock or the like of circular cross-section. Such prior techniques, however, are not as readily adaptable to the production of elongated pieces where a rectangular or other angular cross-section is desired. From one standpoint, the present invention is particularly suited to the production of pieces of angular cross-section, as will further appear.

It is here also noted that slugs produced in accordance with the techniques of the prior applications above referred to have especially desirable physical characteristics for hot working according to the present invention. In fact, a preferred method of fabrication of an elongated piece, such as a rod, according to the present invention, contemplates the successive steps of initially molding a slug of somewhat larger diameter at a temperature above the melting point of the nylon, substantially out of contact with the atmosphere, and under pressure applied axially of the slug; and thereafter hot working the slug, advantageously by extruding at a temperature below the melting point of the nylon (in the case of the specific nylon referred to above, preferably between about 440° F. and 480° F.), so as to effect a reduction to the cross-sectional dimension desired. Rods of exceptional soundness and tensile strength may be produced in this way.

This technique of first molding a slug under pressure applied axially of the piece and thereafter hot working the slug is particularly suitable to the production of pieces of angular cross-section, in which case the slug is molded to a circular cross-section in the initial stage of the fabrication and thereafter this slug of circular cross-section is hot worked to the desired angular shape, for instance by forging.

Although the invention is applicable to a variety of types of nylon, it is particularly useful in connection with the superpolymers having sharp melting points above 450° F., such as obtained by reacting certain diamines with sebacic acid, but most especially with the pronouncedly crystalline high melting type of nylon which is exemplified by the specific example given above, in which the melting point of the dry material normally occurs slightly above 500° F. In general, it may be said that the hot working contemplated by the present invention should occur at a temperature in a range extending from a point appreciably below the melting point of the nylon, say 5° or 10° below, down to about 75° F. below its melting point. Thus, with the specific nylon polyhexamethylene adipamide (melting point about 505° F.) a suitable temperature may be between 425° F. and 500° F., most desirably between about 440° F. and 480° F. It should be understood that the most advantageous temperature will depend somewhat upon the size of the piece being handled and also upon other factors, such as the extent of working desired.

I have also employed a rotary swager to effect approximately a 25% hot reduction in cross-sectional area of a rod of ¾" diameter made from the specific polymer mentioned just above. Moreover, I have hot forged a ¾" diameter round slug to a flat shape of 9/32" thickness without resulting in development of edge or other cracks of any kind.

To illustrate the effect of hot working at various different temperatures, I have carried out a series of comparative treatments, in accordance with the following:

A group of seven specimen rods formed of polyhexamethylene adipamide by molding the same under high pressure applied axially of the rods was used in this series of comparative fabrications. Each rod was of circular cross-section, was 3" long and ¾" in diameter. About one-half the length of each rod was immersed for approximately fifteen minutes in a hot oil bath at different temperature, and each piece was then hit about 40 sharp blows with a three-pound hammer on a blacksmith anvil. The temperature of heating of the seven specimen rods were as follows:

| | | | |
|---|---|---|---|
| A | 350° F. | E | 475° F. |
| B | 375° F. | F | 480° F. |
| C | 400° F. | G | 485° F. |
| D | 450° F. | | |

The effect of variation in temperature was very strikingly demonstrated by the series of examples just referred to. Sample A showed virtually no effect whatever from the attempt at hot working. Sample B showed a very minute effect. Samples C and D indicated a slight effect. The really pronounced effect, however, did not show up until the temperature of 475° F. was reached, as per sample E. The most pronounced increase in hot workability was manifested in the small temperature range extending upward from about 475° F. Thus, samples F and G were very substantially flattened. The forged end of sample F was altered in cross-sectional shape to a flat oval of about ½" minor axis and 1" major axis. The piece of sample G was still flatter, being only about ⅜" thick and having a major axis dimension of about 1⅛".

The effect of increase in temperature upwards of 475° F. was very pronounced. From the data given it will also be seen that in the case of hot working of polyhexamethylene adipamide the temperature is quite a critical factor, the hot working being especially effective in the temperature range extending from about 475° F. to 500° F.

The fact that the specimen pieces in the comparative examples referred to just above were all subjected to sharp hammer blows rather than to a constant pressure in a press is of importance in demonstrating the true effect of the hot working, and avoiding confusion of the hot working itself with cold or plastic flow (a phenomenon which commonly takes place with all thermoplastic materials when maintained under continued pressures).

It should be understood that additions of fillers or pigments to the nylon to obtain special properties or colors will not change the fundamental concept of this invention.

The present application is a continuation-in-part of my copending application, Serial No. 636,503, filed December 21, 1945, now abandoned.

I claim:

1. A method for fabricating articles from a synthetic linear polyamide having a melting point in the neighborhood of 500° F., which method comprises hot working the polyamide to the desired article shape by applying pressure thereto, with the temperature of the polyamide above 425° F. but below the melting point.

2. A method according to claim 1 in which the hot working is effected at a temperature between about 440° F. and about 480° F.

3. A method for fabricating an elongated article from a synthetic linear polyamide having a melting point in the neighborhood of 500° F., which method comprises hot working a slug of the polyamide by extruding the same at a temperature between about 440° F. and about 480° F.

4. A method for fabricating articles from a synthetic linear polyamide having a melting point above about 450° F., which method comprises hot working the polyamide to the desired article shape by applying pressure thereto, with the temperature of the polyamide in a range extending from about 5° F. below its melting point down to about 75° F. below its melting point.

5. A method for fabricating an article from a synthetic linear polyamide, which method comprises hot working a preformed polyamide slug of cross-sectional area at least equal to that of a rod of ¼" diameter, the hot working being effected by applying pressure thereto at a temperature in a range from 5° F. to 75° F. below the melting point of the polyamide.

6. A method for fabricating articles from a synthetic linear polyamide, which method comprises molding a cylindrical slug of the polyamide at a temperature above its melting point, maintaining the slug under axially applied pressure during cooling thereof, reheating the slug to a temperature in a range from 5° F. to 75° F. below the melting point of the polyamide, and while so reheated working the slug to the desired shape by applying pressure thereto.

7. A method for fabricating articles from a synthetic linear polyamide, which method comprises molding an elongated cylindrical slug of the polyamide at a temperature above its melting point, maintaining the slug under pressure applied endwise thereof during cooling, and working the slug to the desired shape by applying pressure transversely to the axis of the slug while at a temperature in a range from 5° F. to 75° F. below the melting point of the polyamide.

8. A method for fabricating articles from polyhexamethylene adipamide which method comprises forging a slug of the polyamide to the desired shape while at a temperature of from 475° F. to 500° F.

9. A method for fabricating articles from polyhexamethylene adipamide which method comprises first molding a cylindrical slug of the polyamide while under pressure applied axially thereof, and thereafter forging said slug to the desired shape by applying pressure to the slug transversely thereof while at a temperature of from 475° F to 500° F.

10. A method for fabricating an article of angular section from polyhexamethylene adipamide, which method comprises molding a cylindrical slug of the polyamide at a temperature above its melting point, cooling the slug under axially applied pressure of at least 10,000 lbs/sq. in., reheating the slug to a temperature between 475° F. and 500° F., and while so reheated forging the cylindrical slug to the desired angular section.

LOUIS L. STOTT.

REFERENCES CITED

The following references are of record in the file of this patent:

UNITED STATES PATENTS

| Number | Name | Date |
|---|---|---|
| 2,244,208 | Miles | June 3, 1941 |
| 2,305,362 | Taylor | Dec. 15, 1942 |
| 2,385,318 | Wiley | Sept. 18, 1945 |
| 2,389,655 | Wende | Nov. 27, 1945 |
| 2,445,726 | Willert | July 20, 1948 |